US006528762B2

(12) United States Patent
Mayer (10) Patent No.: US 6,528,762 B2
(45) Date of Patent: Mar. 4, 2003

(54) LASER BEAM POSITION CONTROL APPARATUS FOR A CNC LASER EQUIPPED MACHINE TOOL

(75) Inventor: Joachim Mayer, Belvidere, IL (US)

(73) Assignee: W. A. Whitney Co., Rockford, IL (US)

( * ) Notice: Subject to any disclaimer, the term of this patent is extended or adjusted under 35 U.S.C. 154(b) by 0 days.

(21) Appl. No.: 09/781,627

(22) Filed: Feb. 12, 2001

(65) Prior Publication Data

US 2002/0108939 A1 Aug. 15, 2002

(51) Int. Cl.[7] .......................... B23K 26/04; B23K 26/20; B23K 26/36
(52) U.S. Cl. ............................. 219/121.83; 219/121.79; 219/121.81
(58) Field of Search ....................... 219/121.78, 121.79, 219/121.81, 121.83, 121.63, 121.67; 356/153, 400; 374/32

(56) References Cited

U.S. PATENT DOCUMENTS

| | | | |
|---|---|---|---|
| 4,496,865 A | 1/1985 | Allen et al. | 310/80 |
| 4,618,759 A | 10/1986 | Miller et al. | 219/121 LR |
| 4,675,501 A | 6/1987 | Klingel | 219/121.67 |
| 4,692,623 A * | 9/1987 | Roberts et al. | 374/32 |
| 4,707,596 A | 11/1987 | Hohberg | 250/201 |
| 5,011,282 A | 4/1991 | Ream et al. | 356/153 |
| 5,090,797 A * | 2/1992 | Cleveland et al. | |
| 5,107,365 A * | 4/1992 | Ota | |
| 5,600,478 A * | 2/1997 | Stevens | |
| 5,624,437 A * | 4/1997 | Freeman et al. | |
| 5,646,765 A * | 7/1997 | Laakmann et al. | |

FOREIGN PATENT DOCUMENTS

| | | | |
|---|---|---|---|
| DE | 3812091 C1 * | 6/1989 | |
| JP | 8-215873 A * | 8/1996 | |

OTHER PUBLICATIONS

Prometec GmbH Brochure for Laserscope UFC 60; Copyright 1997; 2 Pages.
Newport Packet of Various Drives; 19 Pages.
Bolometer Article from MSN Encarta; Copyright 1997; 1 Page.

* cited by examiner

Primary Examiner—Geoffrey S. Evans
(74) Attorney, Agent, or Firm—Leydig, Voit & Mayer, Ltd.

(57) ABSTRACT

A laser beam position control apparatus for a CNC laser equipped machine tool, that will automatically maintain precise alignment of the beam path, though the machine may be operating in a non-uniform temperature environment. The apparatus compensates for small deviations in flatness of machine mounting surfaces by steering the laser beam. The laser beam control apparatus includes a laser beam position sensor for mounting in the beam path of the machine tool and that communicates with a signal processor that in turn communicates with at least one drive apparatus that controls at least one actuator capable of moving an object to steer the laser beam.

30 Claims, 10 Drawing Sheets

FIG. 10

LASER BEAM POSITION CONTROL APPARATUS FOR A CNC LASER EQUIPPED MACHINE TOOL

FIELD OF THE INVENTION

The present invention generally relates to machine tools, and more particularly relates to laser equipped CNC machine tools having long laser beam paths and that are used to cut and weld parts from carbon steels, stainless steel and aluminum.

BACKGROUND OF THE INVENTION

Flying optic CNC laser cutting machines and cantilevered CNC laser cutting and welding machines with working areas of two meters by 4 meters and above have long beam paths, the distance between the laser and the focal optic, exceeding 8 meters in length. Individual sections of the beam path can exceed 6 meters in length. Such machines, usually having a large structural frame or base manufactured of steel, are susceptible to degradation in alignment of the beam path caused by temperature gradients in the factory in which they are used.

Cycling of shop heating and cooling equipment, opening and closing doors and windows cause temperature variations within the shop. Residual heat from operations of laser-equipped machine tools can also be a cause of temperature related effects on machine tool structures. Because cold air tends to fall and warm air tends to rise, the temperature at floor level tends to be cooler than that at elevations above the floor. Carbon Steel has a property that it expands at 0.00000633 inch per inch of length per degree Fahrenheit. Non-uniform temperatures from floor level to upper surfaces of the base cause the base to expand non-uniformly. Way mounting surfaces machined flat and straight in a uniform temperature environment crown slightly convexly in such conditions. As a result one or more machine motions may travel along an arched surface while the laser beam within the beam path travels in a straight line. Thus the position of the bending mirror(s) carried on moving machine elements may shift relative to the centerline of the laser beam as the as the bridge and cutting head travel from respective end of travel to opposite end of travel. The bending mirror(s) shifting cause the laser beam to impinge on and be reflected from a different position on the mirror than intended, thus causing the focused beam to shift from its centered position within a cutting nozzle or a welding head, and thus causing degradation of cutting or welding quality or of part accuracy.

Such machines also may have an optical carriage configured to maintain a constant length beam path, as opposed to a variable length beam path between the laser and the cutting nozzle or welding head. Such optical carriages tend to have a short wheelbase, the distance between linear bearings on a common linear way. Small deviations in flatness of the machine mounting elements and linear ways cause angular deviation in pointing of the laser beam. Small deviations are magnified by the long path length and can also be a source of alignment degradation.

SUMMARY OF THE INVENTION

It is an objective of the invention to provide a laser beam position control apparatus for a large laser equipped CNC machine tool that will automatically maintain the precise alignment of the beam path, though the machine may be operating in a non-uniform temperature environment and/or with residual heat from machine operation that may cause the machine base to crown or otherwise deviate from the intended form.

Another objective of the invention is to provide a laser beam position control apparatus, for a large laser equipped CNC machine having long beam path segments and an optical carriage with a short wheelbase, that will automatically correct for small deviations in flatness of machine mounting elements and/or linear ways that cause angular deviation in the pointing of the laser beam.

It is a preferred form and objective of the invention to monitor the position of the laser beam within the beam path as the machine is in motion, to sense when the beam is moving from its intended position, to generate an error signal indicative of position error and direction, to use the error signal as an input to a drive apparatus, and for the drive apparatus to output a corrective signal to activate a correction apparatus such that the laser beam is returned to its intended position.

It is a preferred form of the invention for the correction apparatus to consist of two actuators moving a common object to steer a laser beam.

It is an alternate form of the invention for the correction apparatus to consist of two actuators, each moving a separate object to steer the laser beam.

It is a preferred form and objective of the invention to provide a control system for the laser beam position control apparatus that, when activated, functions separately from the CNC of the laser equipped CNC machine tool.

Another objective and preferred form of the invention is to provide a laser beam position control apparatus that is adaptable to one or more axes to automatically maintain the alignment of the beam path.

Yet another objective is to provide an alternative control scheme for the laser beam position control apparatus wherein the central processor of the CNC of the laser equipped CNC machine tool performs the signal processor functions.

According to the invention, in alternative control schemes for the laser beam position control apparatus, the signal processor resides in the laser beam position sensor enclosure or in a Personal Computer (PC).

While the invention is susceptible of various modifications and alternative constructions, certain illustrative embodiments thereof have been shown in the drawings and will be described below in detail. It is noted that, unless the context indicates otherwise, references to "cut", "cutting", "cutting head" and "cutting machine" are meant to be inclusive of "weld", "welding", "welding head", and "welding machine". It also should be understood that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Figure 1:
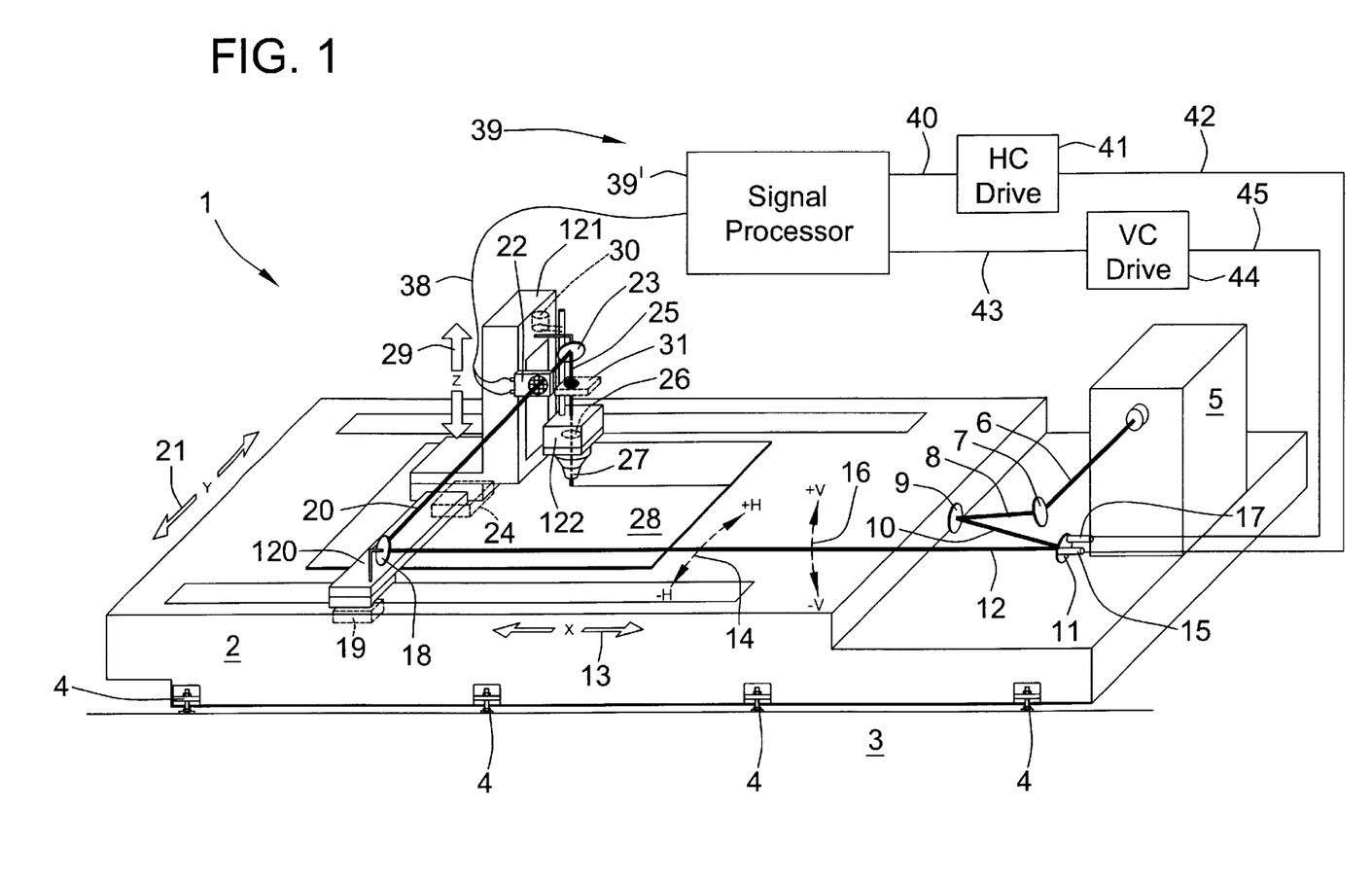
FIG. 1 is a sketch of a laser equipped machine tool illustrating a preferred embodiment of the invention.

Referring to FIG. 1 of the drawings there is a sketch of a large laser equipped machine tool 1 for cutting metals. The machine tool is shown in greatly simplified form for emphasizing the invention, and has a base 2 supported on floor 3 by several leveling screws 4. A laser 5 is mounted on one end of the base, emitting laser beam 6. Laser beam 6 impinges on first beam path mirror 7 and is reflected along path 8 to impinge on second beam path mirror 9. While mirror 9 may be flat, it is often convexly curved for enlarging the laser beam to reduce divergence of the beam and as such is the first mirror of a collimator. The laser beam is reflected from mirror 9 along path 10 to impinge on third beam path mirror 11. While mirror 11 may be flat, it is often the second collimator mirror curved concave to set the final size of the laser beam. Mirror 11 can also be an adaptive optic, a form of a deformable mirror for purpose of controlling beam size and divergence. The laser beam is reflected from mirror 11 along path 12 that is parallel to the X-axis 13 of the machine. The labeling of the axes here follows normal conventions but the X and Y axes may be reversed or otherwise labeled.

In practicing the invention, an adjustable object is interposed in the beam path and associated with an actuator such that the combination is capable of steering the laser beam. In the illustration of FIG. 1, mirror 11 performs the function of the adjustable object. Mirror 11 is adapted to be pivoted in a horizontal plane 14 by actuator 15 and in a vertical plane 16 by actuator 17. In the preferred embodiment actuators 15 and 17 are motor driven and contain a translation screw to move an object. However electrostrictive actuators, piezoelectric actuators and other types of actuators could be adapted to the purpose.

The laser beam traveling along path 12 impinges upon fourth mirror 18, sometimes called a bending mirror, mounted on the end of a gantry or bridge 120 which is driven by a linear servo motor 19. The laser beam is reflected from mirror 18 along path 20 parallel to the Y-axis 21 through sensor 22 to impinge on fifth mirror 23. Mirror 23, also considered a bending mirror, is mounted on a Y-axis carriage 121, above a cutting head 122. The Y-axis carriage 121 is adapted to travel along the gantry 120, parallel to Y-axis 21 and perpendicular to X-axis 13, the Y-axis carriage being driven by linear servomotor 24. The laser beam is reflected from mirror 23 along path 25 through focusing lens 26, which focuses the laser beam to a high energy density spot. The laser beam continues along path 25 through cutting nozzle 27 to cut workpiece 28. Focal lens 26 and cutting nozzle 27 are mounted in the cutting head 122, carried on the Y-axis carriage 121 and adapted to be driven in the Z-axis direction 29 by rotary servo motor 30 to position cutting nozzle appropriately to cut workpiece 28.

In carrying out the invention, a sensor 22 is mounted in the beam path, coaxial to the laser beam. Preferably the mounting and alignment are accomplished after the laser beam path has been aligned and the laser beam has been centered on lens 26, and the focal spot has been centered in nozzle 27. In the preferred embodiment sensor 22 is mounted as close as practical to mirror 23 the last directional bending mirror before the focal lens. Depending on the length of travel in the Z-axis, sensor 22 can be positioned in alternative position 31 above the focal lens. However, in such a position and when the beam is focused by a transmissive lens rather than a reflective focal mirror, the sensor is at greater risk to being damaged should a lens suffer catastrophic failure in service. The term focal lens is intended to be inclusive of a transmissive focal lens or a focal reflective mirror either of which can be utilized to focus a laser beam to cut or weld.

Figure 2:
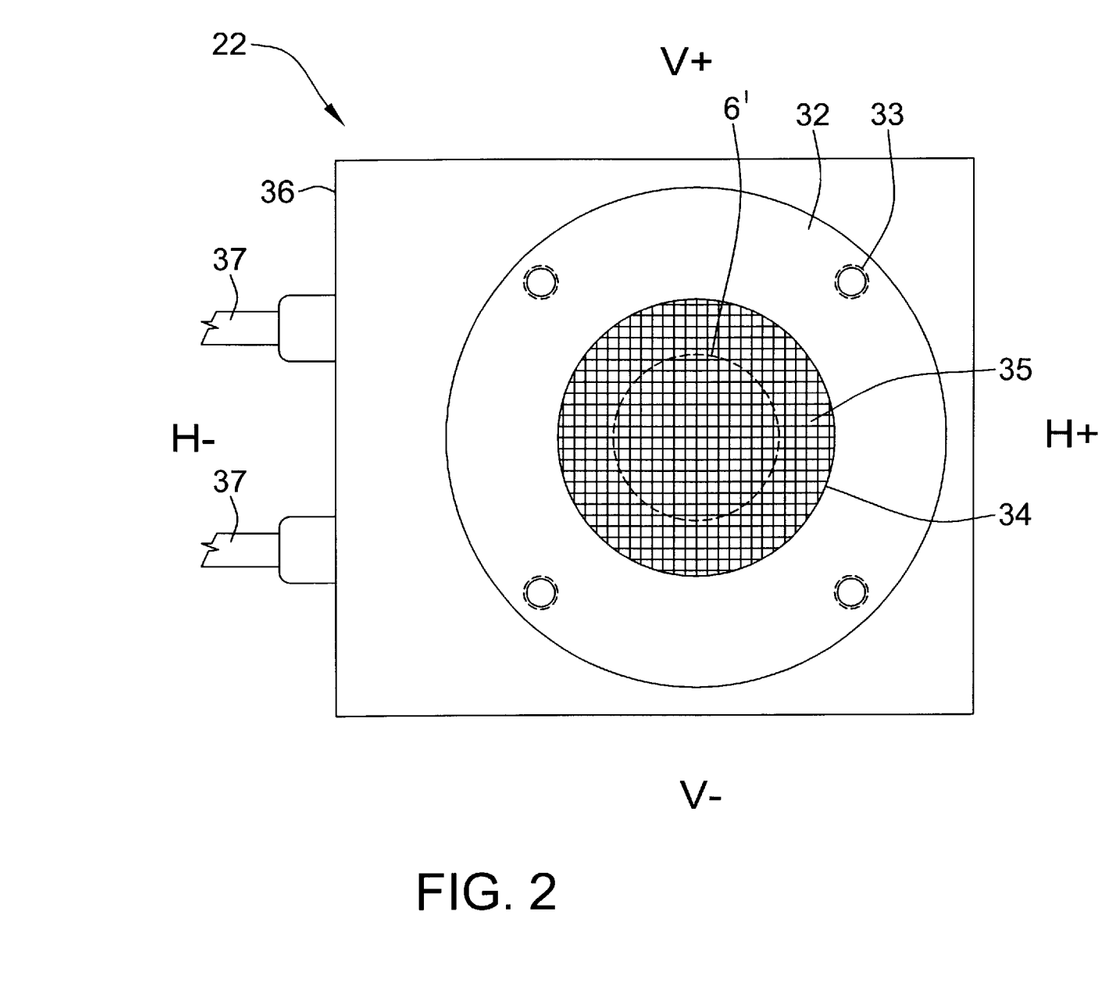
FIG. 2 is a drawing of a sensor capable of determining the position of the beam and taken along lines 2—2 of FIG. 1.

FIG. 2 is a drawing of one type of sensor 22 capable of sensing the position of the laser beam 6', shown in dashed lines, passing through the sensor. Sensor 22 includes a mounting flange 32 having threaded holes 33 for mounting the sensor in the path of the laser beam to be measured. Mounting flange 32 has an aperture 34 extending through the sensor. Within and extending across aperture 34 in horizontal and vertical directions is a grid 35 of very thin platinum wires having linear resistance and temperature characteristics. Preferably the grid is rectangular with the wires having fixed parallel spacing in the vertical and horizontal directions. The measuring principle of sensor 22 is based on the bolometer principle, the measurement of the increase in resistance that results from temperature increases in very thin wires, which in this application is due to partial absorption of the laser radiation from the measured beam. The grid wires 35 absorb a minor portion, approximately 2.5 percent, of laser beam 6'. The temperature increase in the wires is determined by measuring the resistance. The diameter and vertical and horizontal location of laser beam 6' within aperture 34 is determined by measuring the resistance of the wires. Sensor 22 is encased in enclosure 36 and includes one or more electrical connections 37 for incoming power and outgoing signals. A suitable sensor arrangement is available from Prometec GmbH of Aachen Germany, for example their Laserscope UFC 60. Both the sensor and the associated signal processing circuitry for outputting diameter and x, y position are available.

Referring again to FIG. 1 output signals from sensor 22 are communicated by electrical cable 38 to signal processor 39', of laser beam control apparatus 39, where they are processed to determine if the laser beam 6' has moved from intended position. It is noted that the term "signal processor" is meant to be inclusive of dedicated electronic components as a preferred form and of digital computational devices as an alternative form. If the beam 6' has moved, signal processor 39' outputs appropriate corrective signals to either or both of corrective drive modules 41 and or 42. The horizontal corrective signal from signal processor 39' is communicated by cable 40 to HC drive 41 where it is amplified and carried by electrical cable 42 to actuator 15 that steers laser beam 6 in horizontal direction 14 by tilting mirror 11. The vertical corrective signal from signal processor 39' is communicated by cable 43 to VC drive 44 where it is amplified and carried by electrical cable 45 to actuator 17 that steers laser beam 6 in vertical direction 16 by tilting mirror 11.

Referring to FIG. 2 there are directional references about the figure; V+ for vertically high, V− for vertically low, H+ for to the right and H− for to the left. Should sensor 22 detect the laser beam has moved high, toward V+, it will communicate an error signal to signal processor 39', which will output a corrective signal to VC drive 44, which will drive actuator 17 to tilt mirror 11 forward, V− direction, to correct the error. Should sensor 22 detect the laser beam has moved low, toward V−, it will communicate an error signal to signal processor 39', which will output a corrective signal to VC drive 44, which will drive actuator 17 to tilt mirror 11 back, V+ direction, to correct the error. Should sensor 22 detect the laser beam has moved right, toward H+, it will communicate an error signal to signal processor 39', which will output a corrective signal to HC drive 41, which will drive actuator 15 to tilt mirror 11 to the left, H− direction, to correct the error. Should sensor 22 detect the laser beam has moved right, toward H−, it will communicate an error signal to signal processor 39', which will output a corrective signal to HC drive 41, which will drive actuator 15 to tilt mirror 11 to the right, H+ direction, to correct the error. Should sensor 22 detect the laser beam has moved in a compound direction high, toward V+, and to the right, toward H+, it will communicate an error signal to signal processor 39', which will output corrective signals to VC drive 44, which will drive actuator 17 to tilt mirror 11 forward, V− direction, and to HC drive 41 which will drive actuator 15 to tilt mirror 11 to the left, toward H−, to correct the error.

Figure 3:
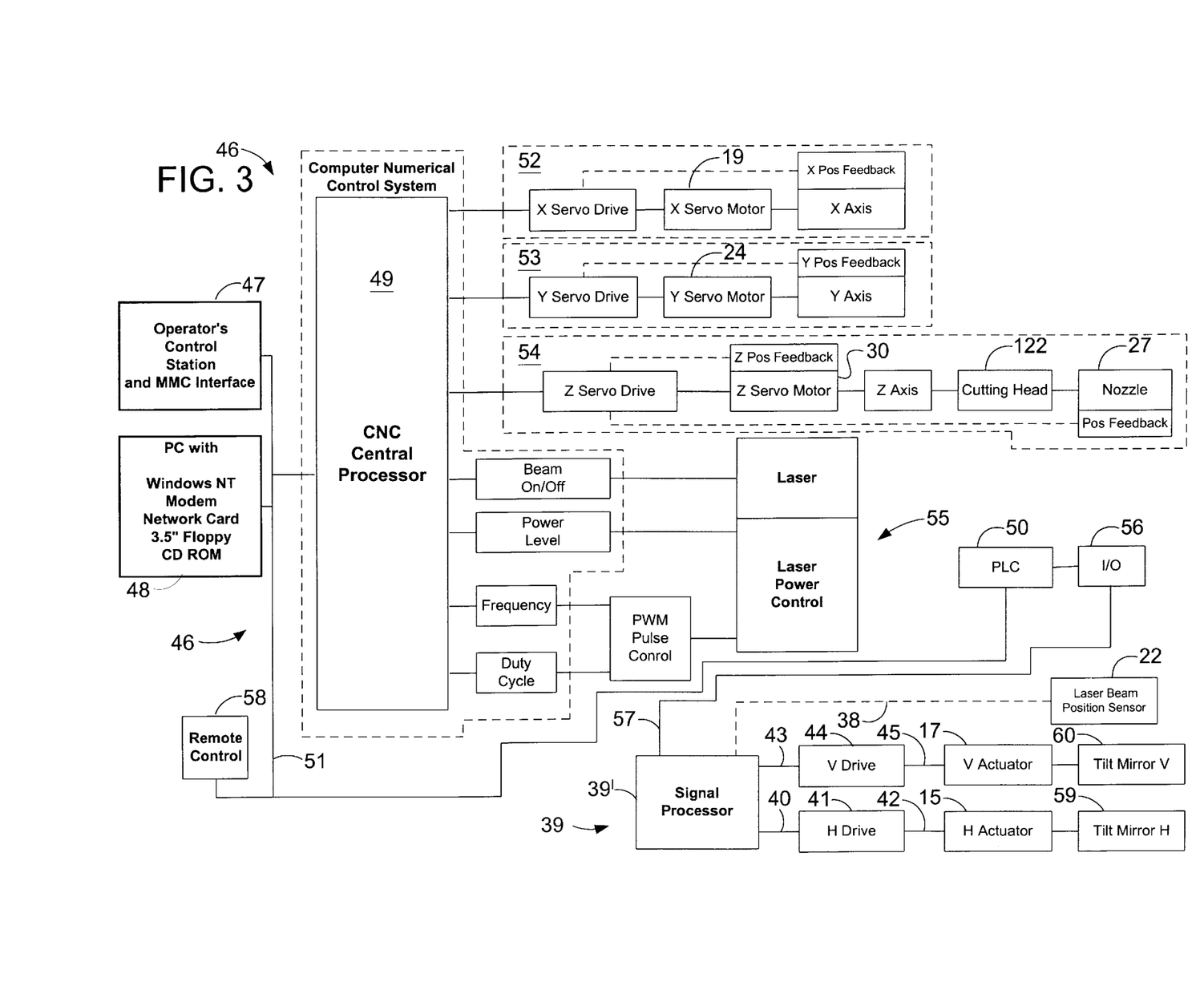
FIG. 3 is a block diagram illustrating a CNC control system for a laser equipped machine tool incorporating the present invention in its preferred form.

Referring to FIG. 3 there is shown a block diagram illustrating a typical CNC control system 46 for a laser equipped machine tool incorporating the present invention in preferred form. The CNC control system has an operator's station 47, the man machine interface to the machine tool, which includes various pushbuttons and switches, a keyboard, and a monitor, providing means for an operator to operate the machine tool. Operator station 47 communicates with PC 48 running Windows NT software, the CNC central processor 49, and Programmable Logic Controller 50, in this case by means of profibus 51. PC 48 includes a network card for connection to a factory computer network, a modem for original equipment manufacturer service support, a floppy drive for manually loading and unloading files, and a CD ROM for loading operation software. The MMC software runs on PC 48, is displayed on operator's station 47, and communicates with the CNC control central processor 49. Computer Numerical Control 46 includes a central processor 49 running the software and part program that controls machine tool 1. CNC central processor 49 communicates with various subsystems that control portions of the machine. CNC central processor 49 issues position and velocity commands to X-axis controlling system 52 that positions the X-axis gantry 120 of the machine, that carries mirror 18 and is driven by linear servo motor 19. CNC central processor 49 also issues position and velocity commands to the Y-axis controlling system 53 that positions the Y-axis carriage 121 carrying sensor 22, mirror 23 and the Z-axis assembly including the cutting head 122, focal lens 26 and cutting nozzle 27. Further, CNC central processor 49 issues position and velocity commands to the Z-axis controlling system 54 that positions focal lens 24 and cutting nozzle 30. CNC central processor 49 also controls the laser subsystem 55. CNC central processor 49 also communicates with programmable logic controller (PLC) 50. PLC 50 controls input/output logic 56 that controls various aspects of the machine such as valves, cylinders and interlocks, activation and deactivation signals.

Signal processor 39' of laser beam position control 39 communicates with operator's station 47 via cable 57, I/O section 56 and profibus 51. Signal processor 39', H drive 41 and V drive 42 of laser beam position control apparatus 39 is preferentially mounted in the electrical cabinet of machine tool 1 for convenience of making electrical connections and for access to electrical power. Signal processor 39' of laser beam position control apparatus 39 also communicates with remote control 58 via cable 57, I/O section 56, and profibus 51. Remote control 58 is typically only used during system setup or service, therefore it is connected via a connector, not shown, so it can be conveniently removed and stored out of the way. The remote control connector would normally be mounted in a sidewall of the main electrical cabinet of machine tool 1. Remote control 58 contains various switches and buttons for taking control of various aspects of the machine for convenience of performing alignment of the beam path such as; controls to operate actuators 15 and 17, controls to jog the axes and controls to operate the laser. Other identifiers of the laser beam position control apparatus in FIG. 3 are the same as in FIG. 1 with the exception that 59 and 60 are added as a reminder that actuators 15 and 17 adjust a mirror to steer a laser beam.

In operation, signal processor 39' of laser beam position control apparatus 39 is activated by a signal from operator's station 47, from PC 48, or from the part program running on CNC central processor 49. Activated, signal processor 39' monitors the signals from sensor 22, which in this case is communicated on cable 38. When sensor 22 indicates the laser beam has moved from intended position, signal processor 39' takes corrective action as previously described and issues an "Active" signal to Operator's Control Station 47. When activated and there is no feedback, signal processor 39' issues a "No Signal" status indicator to operator's station control 47. When sensor 22 detects the position of the laser beam is correct, signal processor 39' does nothing other than monitor the signal and send an "Idle" status signal to Operator's Control Station 47. When the laser beam will be off for some time, laser beam position control system 39 is deactivated by a signal from operator's station 47, from PC 48, or from the part program running on CNC central processor 49.

Figure 4:
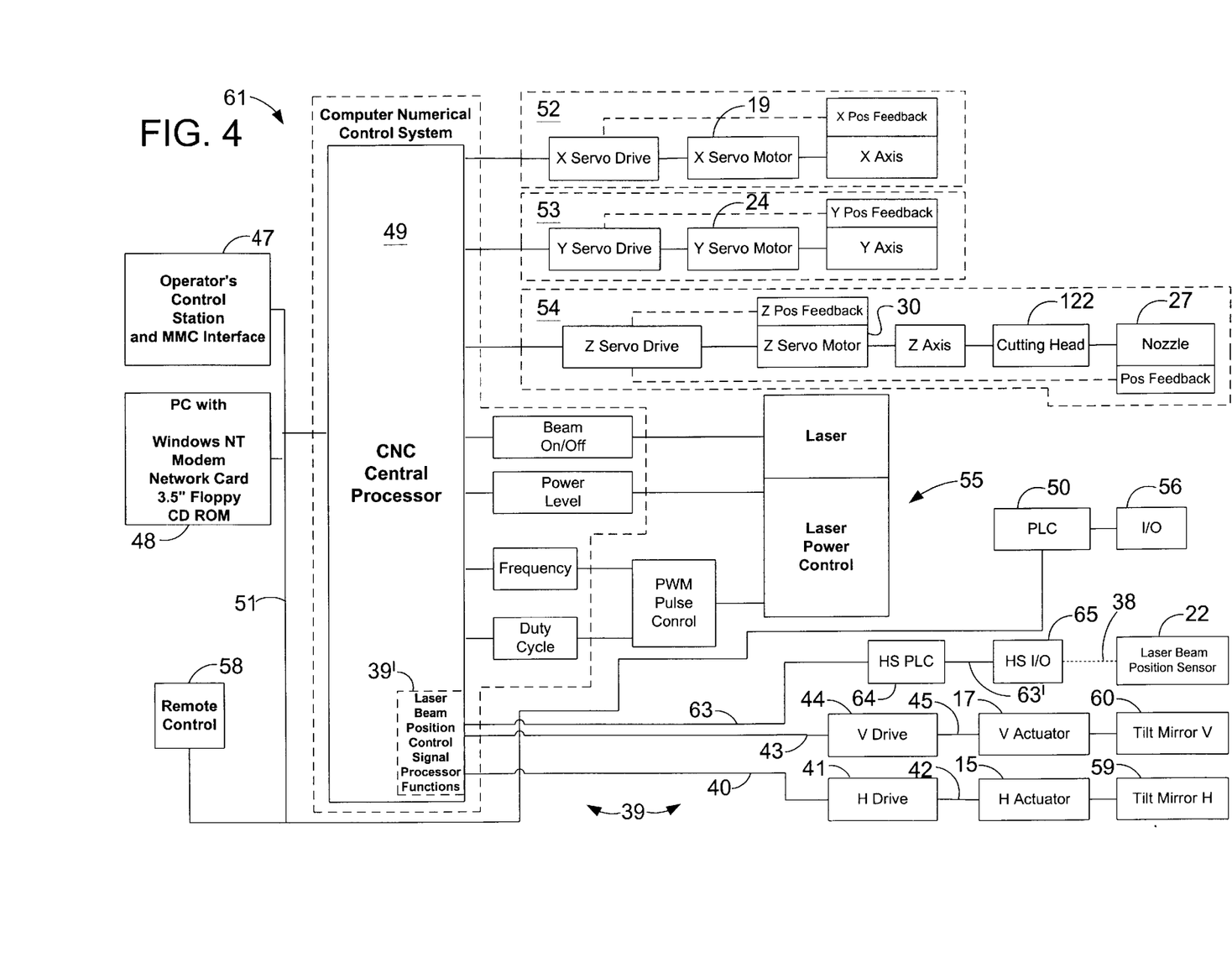
FIG. 4 is a block diagram of a CNC control system for a laser equipped machine tool wherein the central processor of the CNC of the machine tool performs the signal processor functions.

FIG. 4 is a block diagram of a CNC control system 61 for a laser equipped machine tool incorporating the present invention such that the CNC central processor 49 of the machine tool also performs the functions of the laser beam position control apparatus 39 signal processor 39'. Other than that, the CNC system is the same as FIG. 3. Central processor 49 of FIG. 4 also communicates with High Speed Programmable Logic Controller 64 via cable 63 and High Speed I/O section 65 via cable 63'. High Speed I/O Section 65 is suitable for feedback of the laser beam position signal from laser beam position sensor 22, in this case communicated by cable 38. When activated, embedded functions of signal processor 39' of laser beam position control apparatus 39 monitor the signal from laser beam position sensor 22 and when appropriate, sends corrective signals to drives 41 and/or 44 to adjust the position of the laser beam. Otherwise the system functions as previously described.

Figure 5:
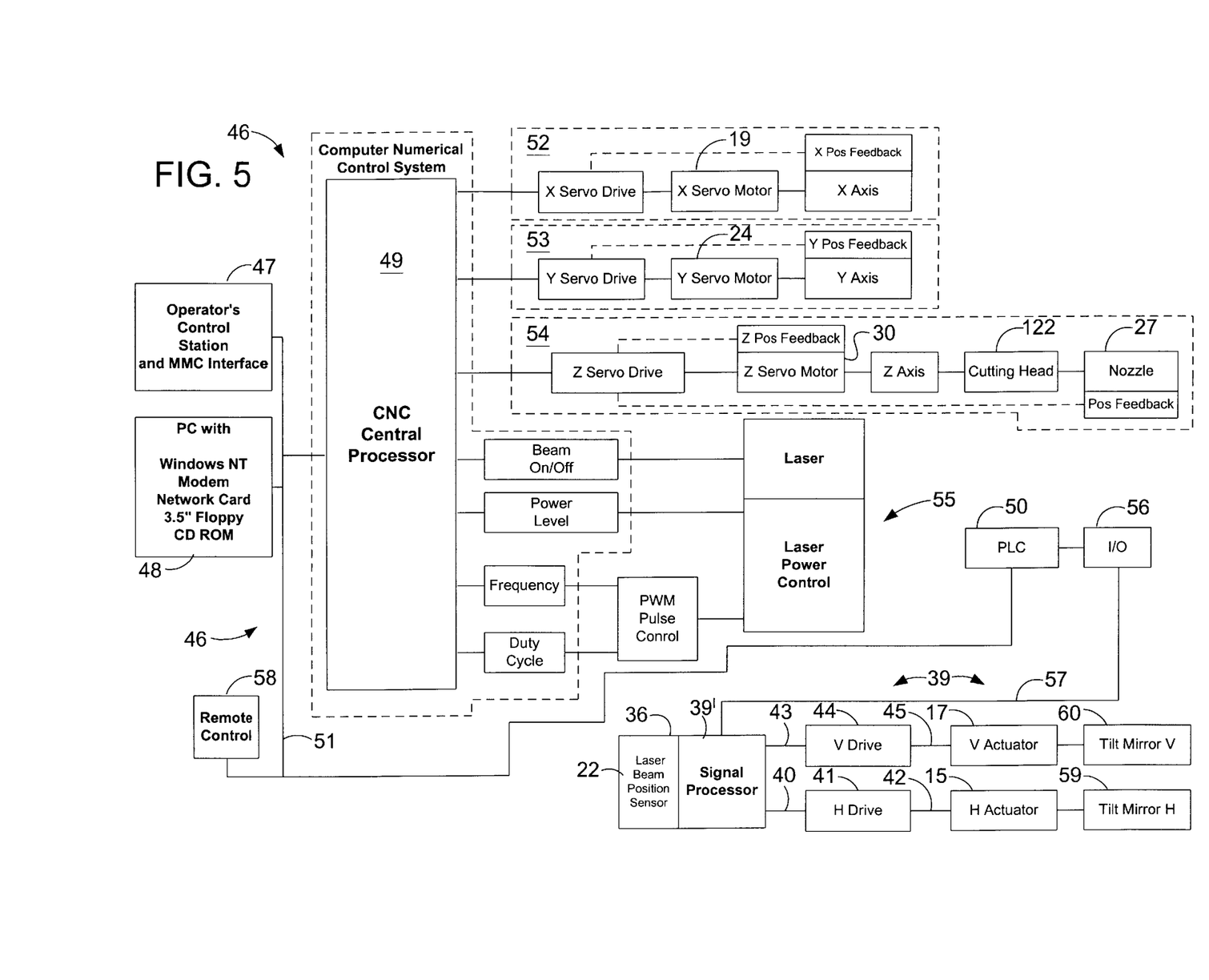
FIG. 5 is a block diagram of a CNC control system for a laser equipped machine tool incorporating the present invention with the signal processor residing in the enclosure of the laser beam position sensor.

FIG. 5 is a block diagram of a CNC control system 46 for a laser equipped machine tool incorporating the present invention with the signal processor 39' residing in the enclosure 36 of the laser beam position sensor 22. In this, case sensor 22 communicates with signal processor 39' by means contained within enclosure 36. Otherwise the laser beam position control system 39 and the CNC system 46 is the same as FIG. 3 and carries like identifying numerals and function.

Figure 6:
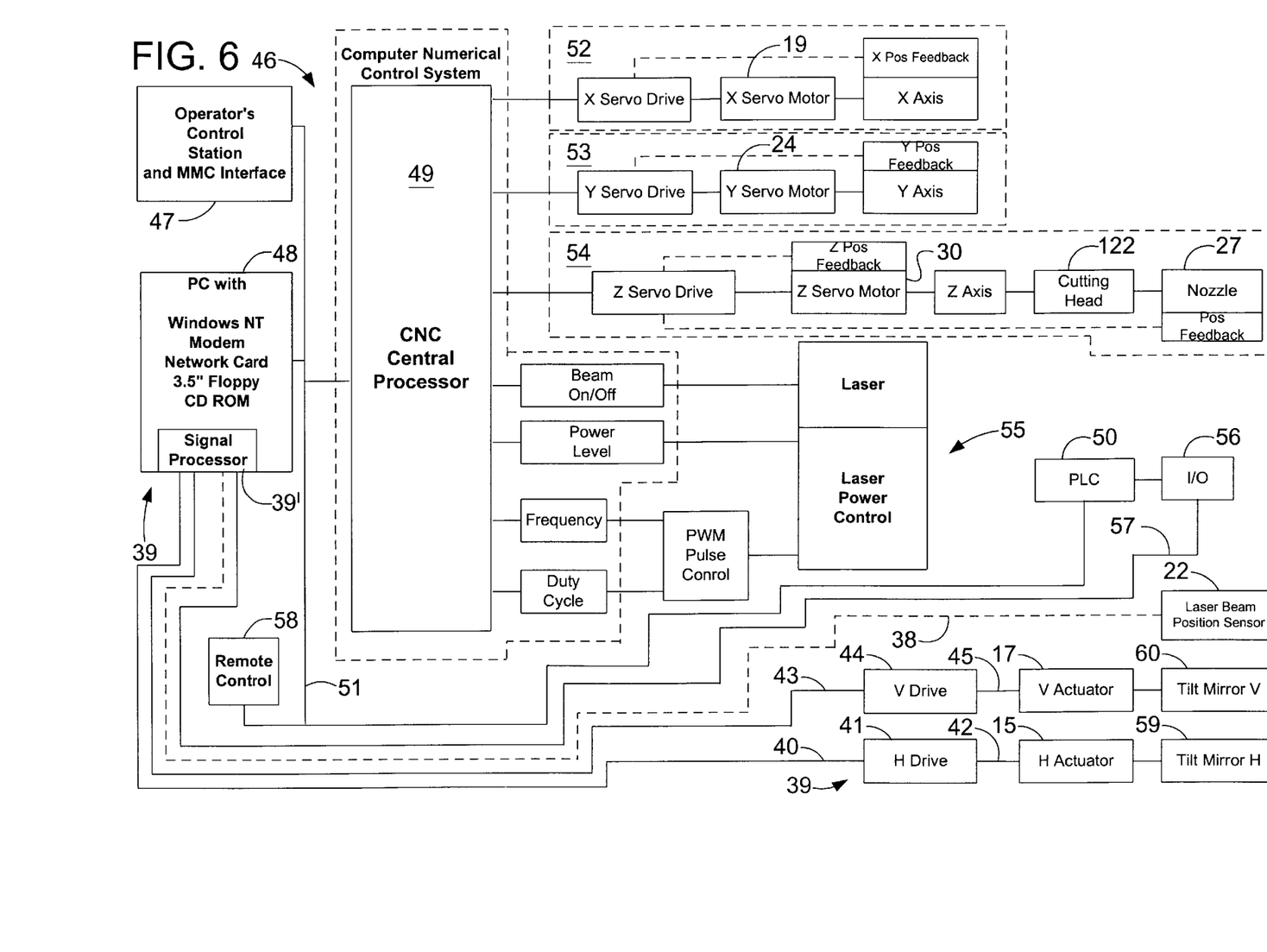
FIG. 6 is a block diagram of a CNC control system for a laser equipped machine tool incorporating the present invention with the signal processor residing in a personal computer.

FIG. 6 is a block diagram of a CNC control system 46 for a laser equipped machine tool incorporating the present invention with the signal processor 39' residing in a card slot of PC 48. Otherwise the system is the same as FIG. 3 and carries like identifying numerals and function.

Figure 7:
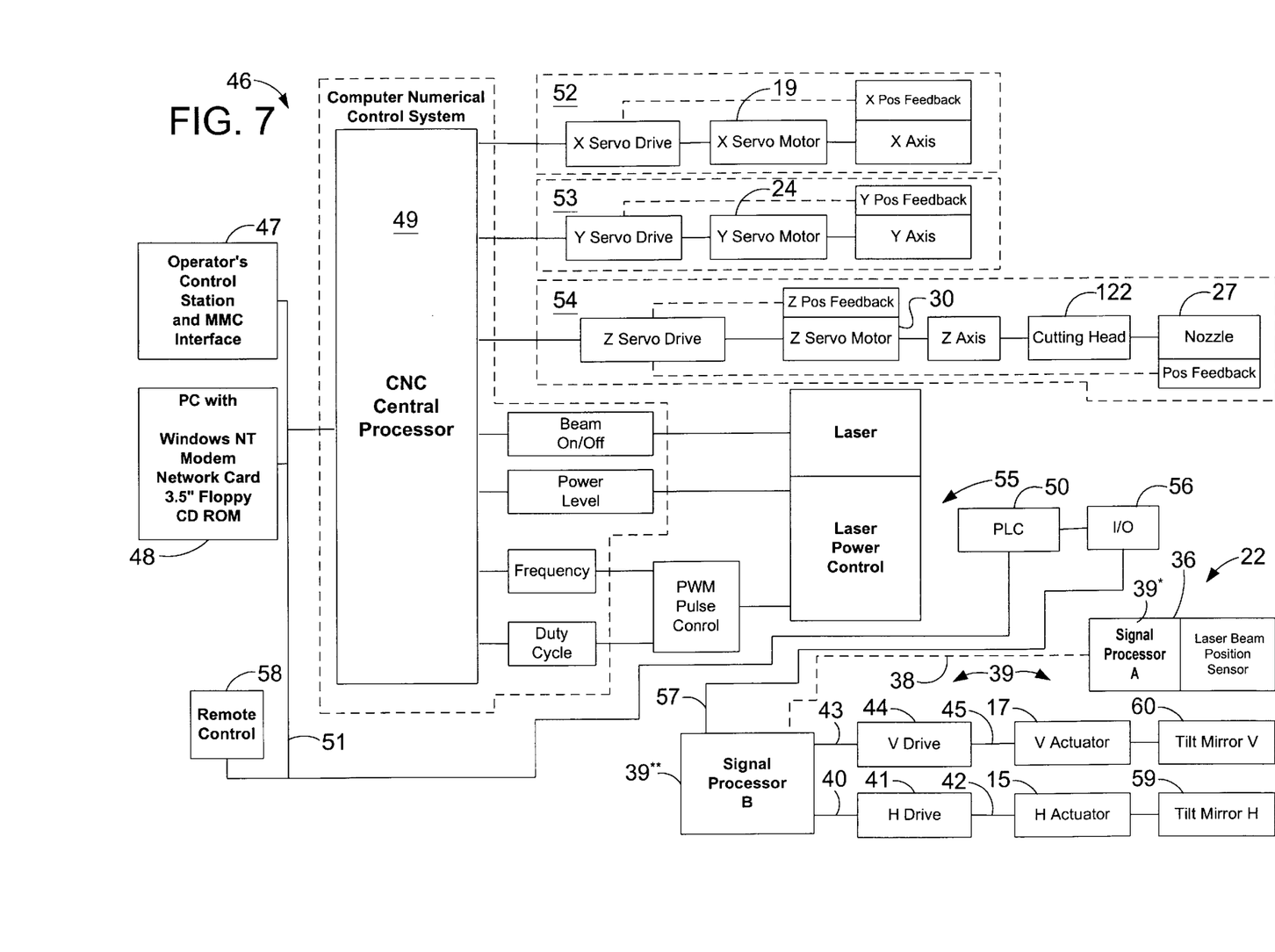
FIG. 7 is a block diagram of a CNC control system for a laser equipped machine tool incorporating the present invention with a distributed signal processor.

FIG. 7 is a block diagram of a CNC control system for a laser equipped machine tool incorporating the present invention with a distributed signal processor. In FIG. 7 signal processor A, 39\* resides in enclosure 36 of laser beam position sensor 22. Signal processor 39\* is a pre-processing stage of sensor 22 for generating beam position signals. The beam position signals are communicated to signal processor B, **39\*\*, in this case by cable 38. Signal processor B, 39\*\*, is the controller portion of laser beam position apparatus 39, activating or deactivating the laser beam position control apparatus upon command, communicating correction signals to drives 41 and/or 42 when necessary, and issuing appropriate status signals to operator's station 48. Otherwise laser beam position control system 39 and the CNC system 46 is the same as FIG. 3 and carries like identifying numerals and function. Any of the control schemes disclosed in FIG. 3, 4, 5, or 6 can be implemented with a distributed signal processor disclosed in FIG. 7**.

Figure 8:
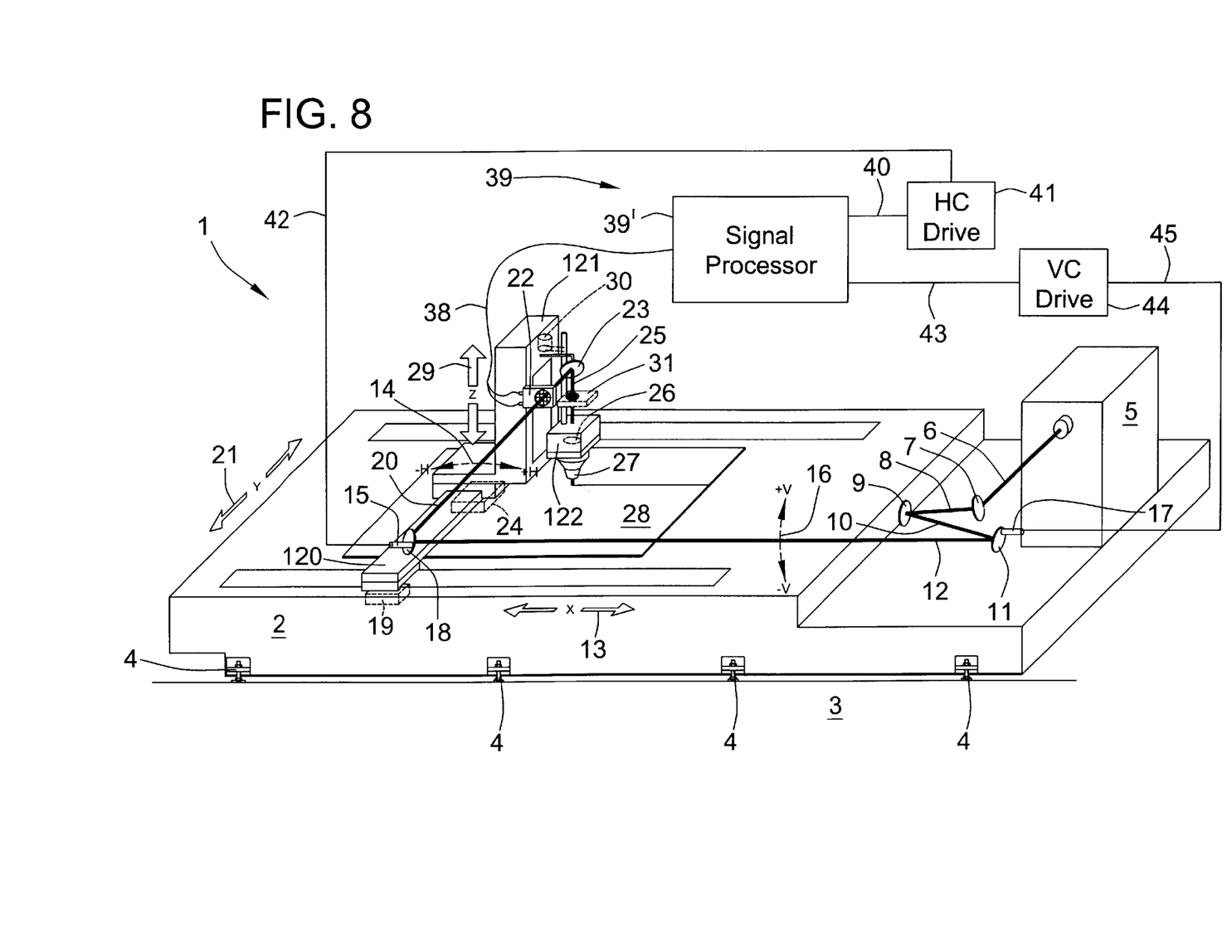
FIG. 8 is a sketch of a large laser equipped machine tool for cutting metals embodying the invention in an alternate form.

FIG. 8 is a sketch of a large laser equipped machine tool for cutting metals embodying the invention in an alternate form. The identifying numbers identify the same parts in FIG. 8 as in FIG. 1 and functions are the same. The difference in FIG. 8 versus FIG. 1 is that actuator 15 for steering the laser beam in the horizontal direction 14 has been moved from mirror 11 to mirror 18, illustrating the distribution of the beam steering function.

Figure 9:
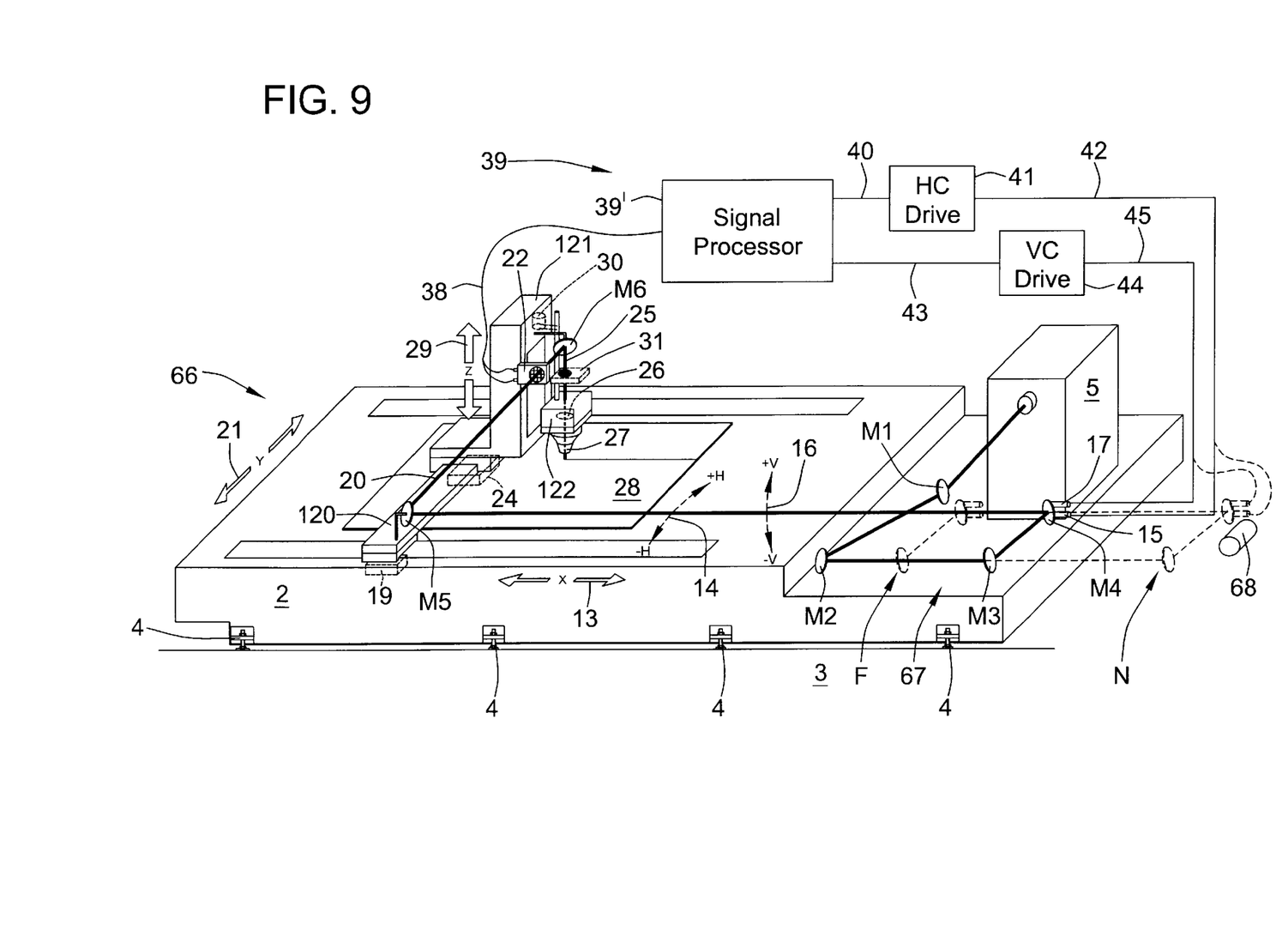
FIG. 9 is a sketch of another large laser equipped machine tool for cutting metals embodying the invention.

FIG. 9 is a sketch of another large laser equipped machine tool for cutting metals 66 embodying the invention. While similar to machine 1, this machine is equipped with a constant beam path device 67. The purpose of constant beam path device 67 is to maintain a constant beam path length between laser 5 and nozzle 27. The beam path system consists of mirrors M1, M2, M3, M4, M5, sensor 22, M6, lens 26 and nozzle 27. Mirrors M3 and M4 are mounted on linear guides, not shown and in this case driven by servomotor 68, for the purpose of adjusting the beam path length to make it constant. The purpose and function of a constant beam path device is well known to persons experienced in the art of designing of such laser equipped machine tools. When the cutting head is positioned the furthest from the laser, extreme left of X-axis travel and extreme Y-axis travel, toward top of sketch, mirrors M3 and M4 are positioned forward, position F, close to the laser. When the cutting head is positioned the nearest to the laser, extreme right of X axis travel and extreme Y-axis travel toward bottom of sketch, Mirrors M3 and M4 are positioned at position N, furthest from the laser. Mirror M4 is fitted with actuators 15, and 17 to steer the laser beam in accordance to the disclosed invention.

Figure 10:
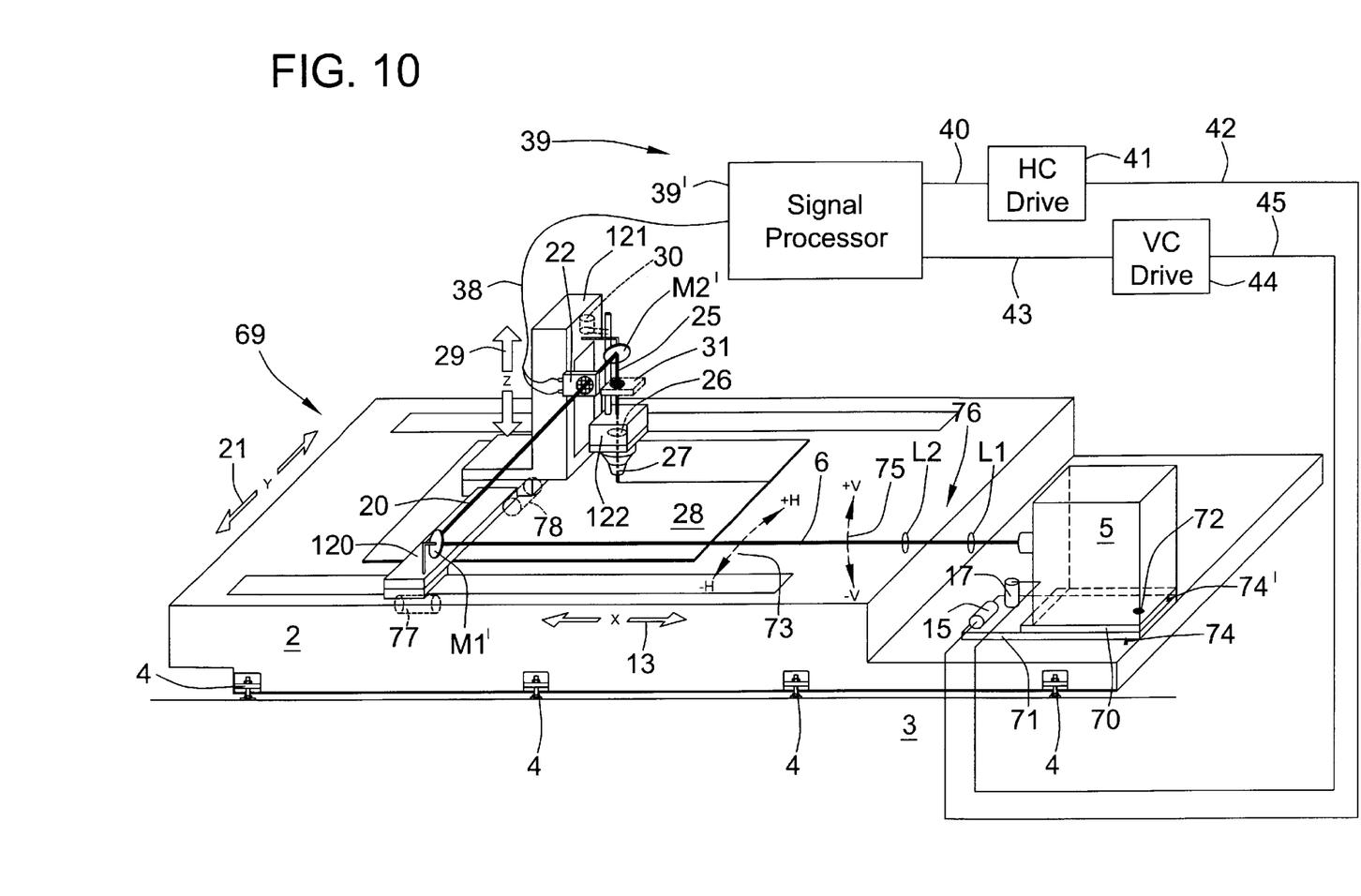
FIG. 10 is a sketch of another large laser equipped machine tool embodying the invention in another form.

FIG. 10 is a sketch of another large laser equipped machine tool embodying the invention in yet another form. Laser equipped machine tool 69 includes base 2 supported by floor 3 by means of leveling screws 4. Laser 5 is mounted on support 70 in turn mounted on support 71 that is attached to base 2. Support 70 is arranged to be pivotable about point 72 such that the laser can be pivoted to steer the laser beam in horizontal direction 73 by actuator 15. Support 71 is arranged to be vertically pivotable about points 74 and 74' such that the laser beam can be steered along vertical direction 75 by actuator 17. In this application, actuators 15 and 17 must have greater power because they are moving the laser rather than a mirror.

Continuing with FIG. 10, transmissive collimator 76 is attached to the front of laser 5 and consists of first lens L1 and second lens L2. Laser 5 emits laser beam 6 parallel to X axis 13. Laser beam 6 impinges upon mirror M1', mounted on the end of a gantry or bridge, not shown, which is driven by servomotor 77. The laser beam is reflected from mirror M1' along path 20 parallel to the Y-axis 21 through sensor 22 to impinge on second mirror M2'. Mirror M2' is mounted on a Y-axis carriage 121 above a cutting head 122. The Y-axis carriage 121 is adapted to travel along the gantry 120 parallel to Y-axis 21 and perpendicular to X-axis 13, the Y-axis carriage being driven by servo motor 78. The laser beam is reflected from mirror M2' along path 25 through focusing lens 26, which focuses the laser beam to a high energy density spot. The laser beam continues along path 25 through cutting nozzle 27 to cut workpiece 28. Focal lens 26 and cutting nozzle 27 are mounted in a cutting head 122, carried on the Y-axis carriage 121, and adapted to be driven in the Z-axis direction 29 by servomotor 30 to position cutting nozzle appropriately to cut workpiece 28.

Sensor 22, FIG. 10 is mounted in the beam path, coaxial to the laser beam, after the laser beam path has been aligned and the laser beam been centered on lens 26 and the focal spot has been centered in nozzle 27. In the preferred embodiment sensor 22 is mounted as close as practical to mirror M2' the last mirror before the focal lens. Signals from sensor 22 are communicated by electrical cable 38 to the signal processor 39', of laser beam position control apparatus 39, where they are processed to determine if the laser beam has moved from intended position on sensor 22. If the beam has moved, signal processor 39' outputs appropriate corrective signals to either or both of corrective drive modules 41 and 42. The horizontal corrective signal from signal processor 39' is communicated by electrical cable 40 to HC drive 41 where it is amplified and carried by electrical cable 42 to actuator 15 that steers laser beam 6 in horizontal direction 73 by pivoting laser 5 about pivot 72. The vertical corrective signal from the signal processor 39' of laser beam position control apparatus 39 is communicated by electrical cable 43 to HV drive 44 where it is amplified and carried by electrical cable 45 to actuator 17 that steers laser beam 6 in vertical direction 75 by pivoting laser 5 about points 74 and 74'.

Though in all shown embodiments of the invention disclose two actuators to steer the laser beam in two directions, in such applications where it would be sufficient to correct the laser beam position along a single plane it would be a simple matter to implement the invention using one actuator instead of two.

It can now be seen by one of ordinary skill in the art that the present invention provides a new and improved laser beam position control apparatus for a large laser equipped machine tool. The invention provides a laser beam position control apparatus for a large laser equipped CNC machine that will automatically maintain the precise alignment of the beam path though the machine may be operating in a non-uniform temperature environment and/or with residual heat from machine operation that may cause the machine base to crown or otherwise deviate from the intended form. The apparatus can also compensate for small deviations in flatness of machine mounting surfaces by steering the laser beam and thus maintain alignment of the beam path.

What is claimed is:

1. A laser beam position control apparatus for a laser equipped machine tool comprising in combination:
   a computer controlled laser equipped machine tool;
   a laser beam position sensor mounted on the machine tool;
   a signal processor that communicates with the laser beam position sensor;
   two drive devices responsive to the signal processor that each control respective actuators moving an object to steer a laser beam that the laser beam position sensor is monitoring;
   wherein the laser beam position sensor comprises a single resistive grid sensor mounted in the beam path of the machine tool; and
   wherein both actuators move a common mirror, one actuator moving the common mirror to steer the laser beam in a vertical direction and the other actuator moving the common mirror to steer the laser beam in a horizontal direction.

2. A laser beam position control apparatus for a laser equipped machine tool comprising in combination:
   a computer controlled laser equipped machine tool including;
   a single laser beam position sensor including a wire grid mounted in the beam path on the laser side of a last directional bending mirror before the focal lens;
   a signal processor mounted separated from the laser beam position sensor and connected to communicate therewith;
   two drive devices connected to communicate with the signal processor;
   the drive devices being connected to control two actuators that are driven by motor and that include a translation screw, both actuators moving a common mirror, one actuator moving the common mirror to steer the laser beam in a vertical direction and the other actuator moving the common mirror to steer the laser beam in a horizontal direction.

3. The combination of claim 2, wherein the signal processor is distributed such that;
   a first signal processor resides in a housing for the laser beam position sensor, produces position signals indicative of the position of a laser beam and communicates the position signals to;
   a second separate signal processor that accomplishes laser beam position control system functions of activation, deactivation, communicating status signals and correction signals.

4. A laser beam position control apparatus for a laser equipped machine tool comprising in combination:
   a computer controlled laser equipped machine tool;
   a single laser beam position sensor including a wire grid mounted in the beam path on the nozzle side of a last directional bending mirror before the cutting nozzle;
   a first signal processor connected to the laser beam position sensor and residing in a housing therewith for producing position signals indicative of the position of a laser beam;
   a second separate signal processor connected to receive the position signals for accomplishing laser beam position control system functions of activation, deactivation, communicating status signals and correction signals;
   two drive devices; and
   two actuators that are driven by motor responsive to the drive devices and that include a translation screw, both actuators moving a common mirror, one actuator moving the common mirror to steer the laser beam in a vertical direction and the other actuator moving the common mirror to steer the laser beam in a horizontal direction.

5. A laser beam position control apparatus for a laser equipped machine tool comprising in combination:
   a computer controlled laser equipped machine tool;
   a single laser beam position sensor including a wire grid mounted in the beam path on the nozzle side of a last directional bending mirror before the cutting nozzle;
   a signal processor connected to the beam position sensor and mounted in an enclosure therewith;
   two drive devices responsive to the signal processor;
   two actuators that are driven by motor responsive to the drive devices and that include a translation screw, both actuators moving a common laser, one actuator moving the laser to steer the laser beam in a vertical direction and the other actuator moving the laser to steer the laser beam in a horizontal direction.

6. A laser beam position control apparatus for a laser equipped machine tool comprising in combination:
   a computer controlled laser equipped machine tool having a laser producing a laser beam which is projected along a beam path including bending mirrors to a workhead, a laser beam position sensor mounted in said beam path proximate a last bending mirror before the workhead, said laser beam being aligned such that it is directed through the workhead;
   said laser beam position sensor having an aperture through which the laser beam passes, a fixed grid of thin wires within said aperture, said thin wires mounted in said aperture in a fixed parallel and perpendicular grid-like spacing, said laser beam position sensor mounted such that said grid intersects the beam path of said laser beam and said grid is located about a proximate centerline of said aligned laser beam, said laser beam position sensor functioning by measurement of the increase of resistance caused by a temperature increase caused by absorption of laser radiation;
   said laser beam position sensor communicating with a signal processor that communicates with a drive device that controls an actuator moving an object to steer the laser beam based on measurements by said beam position sensor; and
   said laser beam position sensor and said actuator being active to maintain the position of the laser beam on said grid during relative motion between the workhead and the workpiece when said laser beam is on.

7. The combination of claim 6, wherein the computer controlled laser equipped machine tool is configured for cutting a workpiece.

8. The combination of claim 6, wherein the computer controlled laser equipped machine tool is configured for welding a workpiece.

9. The combination of claim 6, wherein the laser equipped machine tool has a computer control system, the signal processor being configured as a part of the computer control system.

10. The combination of claim 6, wherein the laser equipped machine tool has a computer control system that activates and deactivates a laser beam position control function, and wherein the signal processor produces signals indicative of the position of the laser beam and communicates said signals to the drive device, communicates status signals to an operator's station of the laser equipped machine tool, and communicates with the computer control system of the laser equipped machine tool.

11. The combination of claim 6, wherein the laser beam position sensor is mounted such that the grid intersects the path of the laser beam and is centered on the centerline of the laser beam.

12. A laser beam position control apparatus for a laser equipped machine tool comprising in combination:

a computer controlled laser equipped machine tool having a laser source producing a laser beam which is projected along a beam path including bending mirrors to a workhead, a laser beam position sensor mounted in said beam path proximate a last bending mirror before the workhead, said laser beam being aligned such that it is directed through the workhead;

said laser beam position sensor having an aperture through which the laser beam passes, a fixed grid of thin wires within said aperture, said thin wires mounted in said aperture in a fixed parallel and perpendicular grid-like spacing, said laser beam position sensor mounted such that said grid intersects the beam path of said laser beam and said grid is located about a proximate centerline of said aligned laser beam, said laser beam position sensor functioning by measurement of the increase of resistance caused by a temperature increase caused by absorption of laser radiation;

said laser beam position sensor communicating with a signal processor that communicates with a drive device that controls an actuator moving an object to steer the laser beam based on measurements by said beam position sensor, said object to steer the laser beam being located proximate the laser source; and said laser beam position sensor and said actuator being active to maintain the position of the laser beam on said grid during relative motion between the workhead and the workpiece when said laser beam is on.

13. The combination of claim 12, wherein the object to steer the laser beam is a beam exit mirror of a reflective collimator.

14. The combination of claim 12, wherein the object to steer the laser beam is a beam exit mirror of a reflective constant beam path device.

15. The combination of claims 12, wherein the position sensor is mounted on the laser side of a last bending mirror before the workhead.

16. The combination of claim 12, wherein the laser beam position sensor is mounted on the workhead side of a last directional bending mirror before the workhead.

17. The combination of claim 12, wherein the object to steer the laser beam moves the laser source.

18. The combination of claim 12, wherein the laser beam position sensor is mounted such that the grid intersects the path of the laser beam and is centered on the centerline of the laser beam.

19. The combination of claim 12, wherein the laser equipped machine tool has a computer control system, the signal processor being configured as a part of the computer control system.

20. The combination of claim 12, wherein the computer controlled laser equipped machine tool is configured for cutting a workpiece.

21. The combination of claim 12, wherein the computer controlled laser equipped machine tool is configured for welding a workpiece.

22. A laser beam position control apparatus for a laser equipped machine tool comprising in combination:

a computer controlled laser equipped machine tool having a laser source producing a laser beam which is projected along a beam path including bending mirrors to a workhead, a laser beam position sensor mounted in said beam path proximate a last bending mirror before the workhead, said laser beam being aligned such that it is directed through the workhead;

said laser beam position sensor having an aperture through which the laser beam passes, a fixed grid of thin wires within said aperture, said thin wires mounted in said aperture in a fixed parallel spacing in vertical and horizontal directions, said laser beam position sensor mounted such that said grid intersects the beam path of said laser beam and said grid is located about a proximate centerline of said aligned laser beam, said laser beam position sensor functioning by measurement of the increase of resistance caused by a temperature increase caused by absorption of laser radiation;

said laser beam position sensor communicating with a signal processor that communicates with two drive devices, each drive device controlling a respective actuator, each said actuator moving an object to steer the laser beam based on measurements by said beam position sensor; and said laser beam position sensor and said actuators being active to maintain the position of the laser beam on said grid during relative motion between the workhead and the workpiece when said laser beam is on.

23. The combination of claim 22, wherein the laser beam position sensor is mounted on the laser side of a last directional bending mirror before the workhead.

24. The combination of claim 22, wherein the laser beam position sensor is mounted on the workhead side of a last directional bending mirror before the workhead.

25. The combination of claim 22, wherein both actuators move a common mirror, one actuator moving the common mirror to steer the laser beam in a vertical direction and the other actuator moving the common mirror to steer the laser beam in a horizontal direction.

26. The combination of claim 22, wherein one actuator moves a mirror to steer the laser beam in a vertical direction and the other actuator moves a different mirror to steer the laser beam in a horizontal direction.

27. The combination of claim 22, wherein both actuators move the laser source to steer the laser beam, one actuator moving the laser source to steer the beam in a vertical direction and the other actuator moving the laser source to steer the beam in a horizontal direction.

28. A laser beam position control apparatus for a laser equipped machine tool comprising in combination:

a computer controlled laser equipped machine tool having a laser producing a laser beam which is projected along a beam path including bending mirrors to a workhead, a laser beam position sensor mounted in said beam path proximate a last bending mirror before the workhead, said laser beam being aligned such that it is directed through the workhead;

said laser beam position sensor having an aperture through which the laser beam passes, a fixed grid of thin wires within said aperture, said thin wires mounted in said aperture in a fixed parallel spacing in vertical and horizontal directions, said laser beam position sensor mounted such that said grid intersects the path of said laser beam and said grid is located about a proximate centerline of said aligned laser beam, said laser beam position sensor functioning by measurement of the increase of resistance caused by a temperature increase caused by absorption of laser radiation;

said laser beam position sensor communicating with a signal processor that communicates with two drive devices, each drive device controlling a respective actuator, said actuators moving a common mirror, one actuator moving the common mirror to steer the laser beam in a vertical direction and the other actuator moving the mirror to steer the laser beam in a horizontal direction;

said laser beam position sensor and said actuators are active to maintain the position of the laser beam on said grid during relative motion between the workhead and the workpiece when said laser beam is on.

29. The combination of claim 28 in which said common mirror is the beam exit mirror of a reflective laser collimator.

30. The combination of claim 28 which said common mirror is the beam exit mirror of a reflective constant beam path device.

* * * * *